United States Patent Office 3,522,617
Patented Aug. 4, 1970

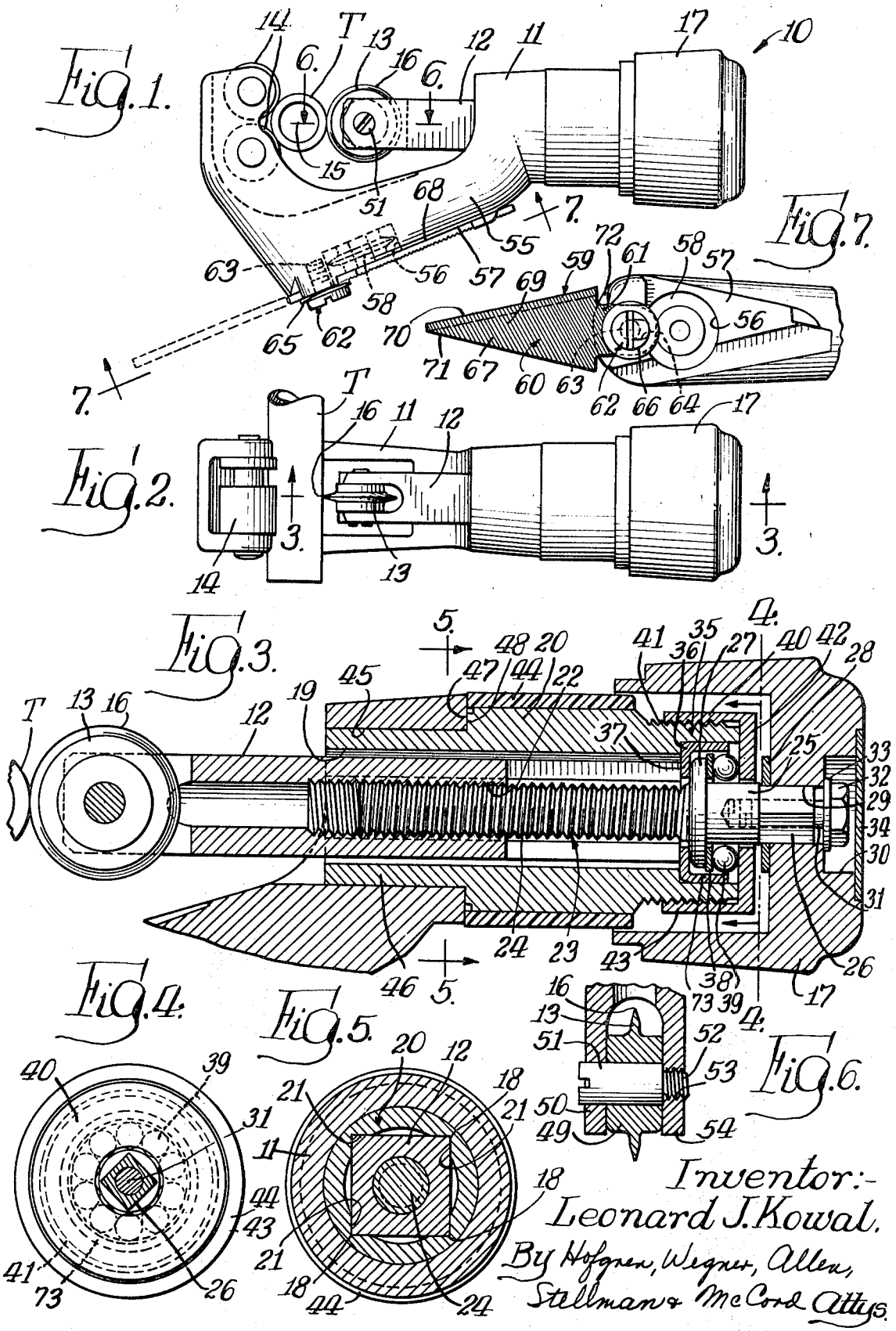

3,522,617
TUBE CUTTER
Leonard J. Kowal, Prospect Heights, Ill., assignor, by mesne assignments, to I-T-E Imperial Corporation, Philadelphia, Pa., a corporation of Delaware
Filed Feb. 14, 1968, Ser. No. 705,541
Int. Cl. B23d 77/14; B26b 25/00
U.S. Cl. 7—14.1                8 Claims

ABSTRACT OF THE DISCLOSURE

A tube cutter for manually cutting tubing by means of a cutting wheel forced against the outer wall of the tubing and moved circumferentially thereabout. The cutting wheel is mounted on a holder which is selectively movable forwardly and rearwardly by a manually operable handle to advance and retract the cutting wheel relative to the tube wall. The tube cutter includes a body portion carrying a deburring blade. The blade is pivotally mounted on the body for selective disposition in a retracted position juxtaposed to the body and a deburring position projecting outwardly of the body.

---

This invention relates to tube working tools and in particular to tube cutters.

One conventional form of tool for cutting tubing such as copper tubing comprises a manually operable hand tool having a body movably carrying a cutting wheel which is forced against the outer wall of the tubing by suitable means of an associated handle. The body is then swung about the axis of the tube to move the cutting wheel annularly about the outer surface to provide an annular score line therein. The movement is continued with the cutting wheel being progressively urged forwardly into the tubing wall as the cutting wheel moves thereabout. When the cut is completed, the cut end of the tubing is internally deburred by a deburring blade movably carried on the body. The present invention comprehends an improved tube cutter of the above described type having new and improved means for movably carrying the cutting wheel and new and improved means for deburring the cut end of the tubing.

Thus, a principal feature of the present invention is the provision of a new and improved tube cutter.

Another feature of the invention is the provision of such a tube cutter having new and improved means for movably carrying the cutting wheel.

A further feature of the invention is the provision of such a tube cutter having new and improved means for deburring the cut end of the tubing.

Still another feature of the invention is the provision of such a tube cutter having a body and manually operable means on the body for transversely cutting a tube, means for deburring the cut tube comprising a blade having a deburring edge for deburring the inner cut edge of a tube cut by said cutting means, means mounting the blade on the body for pivotal movement between a retracted position overlying the body and an operative position projecting outwardly from the body, the mounting means including means for locking the blade selectively in the retracted and the operative position as an incident of manual movement thereof radially to the axis of pivoting, and means on the blade defining a shoulder extending transversely to the radial direction of movement of the blade for digital engagement to facilitate the radial movement and defining means for deburring the outer cut edge of a tube cut by the cutting means.

Yet another feature of the invention is the provision of such a tube cutter wherein the shoulder defining means defines a plurality of shoulders.

A yet further feature of the invention is the provision of such a tube cutter wherein the means for deburring the outer tube edge comprises file means.

Another feature of the invention is the provision of such a tube cutter wherein the blade is defined by a rough outer surface, and a smooth inner surface confronting the body.

Still another feature of the invention is the provision of such a tube cutter having new and improved means for mounting the deburring blade on the body.

A further feature of the invention is the provision of such a tube cutter having a holder for carrying the cutting wheel with new and improved means for longitudinally moving the holder relative to the body for selective advance and retraction of the cutting wheel.

Another feature of the invention is the provision of such a tube cutter wherein the means for moving the holder includes means defining a threaded axial socket in the holder, a screw member having a threaded portion engaging the holder in the socket, and a portion defining a pair of spaced annular collars, antifriction bearing means carried by the body and movably engaging one of the collars for preventing axial movement of the screw member while allowing free rotational movement thereof about the axis thereof, and a handle retained on the screw member against the other of the collars to be disposed outwardly of the body for manually rotating the screw member relative to the body and thereby longitudinally moving the holder.

A still further feature of the invention is the provision of such a tube cutter having new and improved means for mounting the handle relative to the holder and body.

Still another feature of the invention is the provision of such a tube cutter having new and improved cooperating holder and body means providing improved accuracy in the alignment of the cutting wheel radially to the axis of swinging thereof about the tube to be cut.

Other features and advantages of the invention will be apparent from the following description taken in connection with the accompanying drawing wherein:

FIG. 1 is a side elevation of a tube cutter embodying the invention with the deburring blade further illustrated in dotted lines in a deburring position;

FIG. 2 is a top plan view thereof;

FIG. 3 is a fragmentary enlarged diametric section taken substantially along the line 3—3 of FIG. 2;

FIG. 4 is a transverse section taken substantially along the line 4—4 of FIG. 3;

FIG. 5 is a tranverse section taken substantially along the line 5—5 of FIG. 3;

FIG. 6 is a fragmentary longitudinal section taken substantially along the line 6—6 of FIG. 1; and FIG. 7 is a fragmentary bottom view taken along the line 7—7 of FIG. 1 with the deburring blade in the deburring position.

In the exemplary embodiment of the invention as disclosed in the drawing, a tube cutter generally designated 10 is shown to comprise a body 11, a holder 12 movably carried in the body 11 and carrying at one end a cutting wheel 13 for cutting engagement with a tube T to be cut. The body further carries a set of supporting rollers 14 which support the tube T against the cutting forces generated by the cutting wheel 13 as the body is swung about the axis 15 of the tube T with the cutting wheel edge 16 forcibly urged thereagainst. Movement of the holder 12 is effected by a handle 17.

Referring now more specifically to FIGS. 3 through 6, the holder 12 comprises a steel elongated member having a rectangular cross section, herein square, with square corners 18. The holder is slidably longitudinally movable in a corresponding rectangular bore 19 in an end portion 20 of the body 11. As best seen in FIG. 5, the body portion 20 is provided with corresponding square corners 21.

Illustratively, the holder may comprise a square section holder measuring 7/16 inch along each side. The clearance between the holder and the body portion 20 in bore 19 may be approximately .003 inch on each side whereby a maximum misalignment of the holder relative to the body bore will be approximately 55 minutes. It has been found that by effectively minimizing the misalignment to such an extent cutting of a thread in the tube T by the cutting wheel edge 16 is effectively precluded as the cutting wheel edge 16 defines substantially a single plane perpendicular to the axis 15 of the tube T. To maintain this high degree of accuracy, the holder may be formed of a relatively hard material, such as steel.

Referring now to FIG. 3, the holder 12 is provided with a rearwardly opening threaded socket 22. A screw member generally designated 23 includes an exteriorly threaded forward end portion 24 threadedly engaging the holder in socket 22. The member 23 further includes a mid-portion 25 and an outer end portion 26. The mid-portion carries a pair of spaced annular collars 27 and 28 and is right circularly cylindrical therebetween. The outer end 26 has a square cross section as shown in FIG. 4 and is received in a complementary square cross section bore 29 in the handle 17 for locking the handle against rotation relative to the screw member 23. The handle may be provided with an outwardly opening recess 30, and a screw 31 is threaded axially into the end 26 and mid-portion 25 of the screw member 23 with the head 32 of the screw 31 being received in the recess 30. A washer 33 may be provided between the screw head 32 and the outer surface of the handle 17 in the recess 30. Thus, the screw head 32 effectively locks the handle against the collar 28 for axially and rotationally fixed association therewith. A cover plate 34 may be provided on the handle covering the recess 30 as desired.

The mid-portion 25 of the screw member 23 is rotatably journalled in the body end 20 by antifriction means generally designated 35. As shown in FIG. 3, the antifriction means 35 includes a cup-shaped bearing member 36 having an annular inner end wall 37 outwardly slidably engaging the collar 27, and a cylindrical side wall 73 radially outwardly of the collar 27 and extending to axially outwardly thereof. An annular retainer 38 is juxtaposed to the outer surface of the collar 27, and a plurality of ball bearings 39 are disposed axially outwardly of the retainer 38. An L-shaped retainer 40 is provided with a cylindrical inner end wall 43 threaded onto a threaded outer end portion 41 of the body end 20 and is provided with an annular transverse outer end wall 42 extending to axially outwardly of the ball bearings 39 to retain the ball bearings against the retainer 38 and the retainer 38 against the outer surface of collar 27. As shown in FIG. 3, the outer surface of the retainer end wall 42 is spaced inwardly of the collar 28 to permit free rotation of the handle 17.

A plastic sleeve 44 may be mounted on the body end 20 to underlie the inner end of the handle 17 as shown in FIG. 3. As shown in FIG. 3, the body end 20 may comprise a tubular member secured in a bore 45 of the body 11. In the illustrated embodiment, the inner end 46 of the body end member 20 is reduced in diameter to define an annular shoulder 47 abutting the outer surface 48 of the body.

Referring now to FIG. 6, the cutting wheel 13 is shown to include a hub 49 rotatably journalled in a bifurcated end 50 of holder 12 by means of a post 51 having an end portion 52 threadedly secured in a corresponding threaded bore 53 of one leg 54 of the holder end 50. Thus, the wheel 13 is free to rotate about the axis of the post 51 for improved life of the cutting wheel edge 16. As shown in FIG. 1, the body 11 may comprise a generally U-shaped element having a bight portion 55 provided with a recess 56 opening through a flat bottom surface 57 thereof. A replacement cutting wheel 58 may be provided in the recess 56 for use in the event that the cutting edge 16 of the wheel 13 becomes dull.

The cutting wheel 58 is retained in the recess by a deburring blade generally designated 59 which includes a triangular shaped deburring portion 60 connected to the body portion 57 by a tab portion 61. The tab is pivotally secured to the body portion 55 by a pivot screw 62. The shank 63 of the screw 62 extends through an elongated slot 64 in the tab 61, the slot being elongated in the direction of the narrowing of the triangular portion 60. A spring washer 65 is mounted between the head 66 of the screw 62 and the outer surface 67 of the blade to resiliently bias the blade toward the surface 57. The underside 68 of the blade is relatively smooth so as to slide freely over the surface 57 in moving to and from the retracted position shown in full lines in FIG. 1. A stop 72 is provided on the body 11 for engaging the tab portion 61 of the deburring blade and preventing pivotal movement of the blade when in the deburring position of FIG. 7 with the blade moved to the rightmost extreme of its movement on the screw shank 63, and with the blade in the retracted position of FIG. 1 overlying the surface 57 and with the blade urged to the leftmost extreme of its movement on the shank 63. Thus, to permit movement of the blade between the retracted and deburring positions, the user must move the blade away from the screw shank 63 to the limit permitted by the slot 64 and to lock the blade in either of the retracted or deburring positions, the user must move the blade in the opposite direction to the opposite end of the slot 64.

The invention comprehends providing an improved means for facilitating the movement of the blade toward and from the screw shank 63 and, more specifically, comprehends providing a shoulder extending transversely to this direction of movement of the blade which is effectively radially to the axis of the screw 62. In the illustrated embodiment, a plurality of shoulders 69 are provided on the outer surface 67 which as best seen in FIG. 7 extend at an angle slightly less than 90° to this radial direction. Thus, the shoulders 69 provide an improved means for facilitating the movement of the deburring blade to and from the final retracted and deburring positions.

Still further the shoulders 69 are arranged to define a file surface for use in deburring by filing the outer edge of the tube end cut by the tool 10. The inner edge of the cut tube end is effectively deburred in the conventional manner by the deburring edge 70 of the blade portion 60. Where desired, the inner edge may also be deburred as by filing with the tip portion 71 of the blade.

The shoulders 69 are provided over the entire outer surface 67 of the blade including the portion thereof on tab 61. Thus, the shoulders 69 further serve to lock the washer 65 relative to the blade 59.

Thus, a difference in the frictional characteristics of the smooth inner surface 68 and the rough outer surface 67 of the blade provides an improved facility in the digital manipulation of the blade between retracted and operative, or deburring, positions.

While the shoulders 69 may be arranged to extend substantially perpendicular to the direction of movement of the blade to and from the final retracted positions, the slight angularity of the shoulders illustrated in FIG. 7 provides for further improved digital manipulation of the blade in swinging the blade between the retracted and deburring positions as the shoulders thusly extend somewhat transversely to the direction of rotational movement.

The improved structure discussed above for advancing and retracting the holder 12 and the improved cooperating structure of the holder 12 and bore 19 affording the improved aligned accuracy of the cutting wheel 13 provide highly desirable features while yet effectively minimizing the cost of the cutting tool. The improved deburring blade structure discussed above provides still further highly desirable features while yet at effectively minimum cost.

While I have shown and described one embodiment of my invention, it is to be understood that it is capable of many modifications. Changes, therefore, in the construction and arrangement may be made without departing from the spirit and scope of the invention as defined in the appended claims.

We claim:

1. In a tube cutter having a body and manually operable means on the body for transversely cutting a tube, means for deburring the cut tube comprising:

a blade having a deburring edge for deburring the inner cut edge of a tube cut by said cutting means;

means mounting said blade on said body for pivotal movement between a retracted position overlying the body and an operative position projecting outwardly from the body, said mounting means including means for locking said blade selectively in said retracted and said operative positions as in incident of manual movement thereof radially to the axis of pivoting; and means on said blade defining a shoulder extending transversely to the radial direction of movement of the blade for digital engagement to facilitate said radial movement and defining means for deburring the outer cut edge of a tube cut by said cutting means.

2. The tube cutter of claim 1 wherein said shoulder defining means defines a plurality of shoulders.

3. The tube cutter of claim 1 wherein said means for deburring the outer tube edge comprises file means.

4. The tube cutter of claim 1 wherein said means on said blade defines a rough outer surface, and a smooth inner surface confronting the body.

5. The tube cutter of claim 4 wherein said mounting means includes a screw having a shank portion secured to said body and extending through said blade and a head portion outwardly of said blade outer surface, and a washer on said shank between said blade outer surface and said head, said rough outer surface causing said washer to rotate with said blade about the axis of pivoting thereof.

6. The tube cutter of claim 5 wherein said washer comprises a spring washer biasing said blade toward said body and said blade includes an inner smooth surface for slidably engaging the body.

7. The tube cutter of claim 1 wherein said manually operable means includes a cutting wheel, a steel rectangular cross section holder carrying said wheel movably on said body, and means for selectively advancing and retracting said holder to selectively cause the cutting wheel to bite into a tube to be cut and to be retracted therefrom.

8. The tube cutter of claim 1 wherein said manually operable means includes a cutting wheel, an elongated holder longitudinally movably mounted in said body, and having an end portion carrying said cutting wheel, screw means threadedly engaging said holder for selectively advancing and retracting said holder as an incident of rotation of said screw means, antifriction means retaining said screw means against longitudinal movement, and handle means for rotating said screw means in said body.

References Cited

UNITED STATES PATENTS 2,629,926    3/1953    Franck _____ 30—102

OTHELL A. SIMPSON, Primary Examiner

M. G. RASKIN, Assistant Examiner

U.S. Cl. X.R.

30—102; 29—78